United States Patent [19]

Park

[11] Patent Number: 4,543,289

[45] Date of Patent: Sep. 24, 1985

[54] LAMINATED SKIN-FOAMED CORE SANDWICH STRUCTURES AND METHOD FOR THEIR PREPARATION

[75] Inventor: Im K. Park, Somerville, N.J.

[73] Assignee: Tenneco Polymers, Inc., Houston, Tex.

[21] Appl. No.: 686,050

[22] Filed: Dec. 24, 1984

[51] Int. Cl.⁴ .......................... B32B 5/18; B32B 17/04
[52] U.S. Cl. .................................... 428/304.4; 264/41; 264/46.5; 428/318.6; 428/319.7
[58] Field of Search ............... 428/304.4, 318.6, 318.8, 428/319.7; 264/41, 46.5

[56] References Cited

U.S. PATENT DOCUMENTS

| | | | |
|---|---|---|---|
| 3,213,071 | 10/1965 | Campbell | 264/41 |
| 3,272,688 | 9/1966 | Holmstrom et al. | 428/318.6 |
| 4,476,183 | 10/1984 | Holtrop et al. | 428/319.7 |
| 4,486,492 | 12/1984 | Ziliotto | 428/319.7 |

*Primary Examiner*—William J. Van Balen
*Attorney, Agent, or Firm*—Evelyn Berlow

[57] ABSTRACT

Laminated skin-foamed core sandwich structures characterized by an excellent stiffness and load-bearing capability to weight ratio are prepared by heating in a closed mold a sandwich construction that comprises skin layers that comprise a thermoplastic polymer having a glass transition temperature in the range of 75° to 85° C. and reinforcing fibers and a core that comprises a thermoplastic polymer that is compatible with the polymer in the skin layers and that has a glass transition temperature that is 10° to 20° C. lower than that of the polymer in the skin layers and a blowing agent at a temperature sufficient to fuse and expand the core and to fuse the skin layers and bond them to the expanded core.

15 Claims, No Drawings

LAMINATED SKIN-FOAMED CORE SANDWICH STRUCTURES AND METHOD FOR THEIR PREPARATION

This invention relates to a method for the production of sandwich structures having expanded thermoplastic polymer cores and integrally bonded laminated surface or skin layers. More particularly, it relates to a one-step method for the production of rigid structures having a foamed vinyl chloride copolymer core and surface or skin layers of reinforced unfoamed vinyl chloride polymer. It further relates to the products produced by this method.

BACKGROUND OF THE INVENTION

Because sandwich constructions consisting of relatively thin skins of a load-bearing material and a low density core of honeycomb or a rigid plastic foam represent one of the most efficient structural designs in terms of the stiffness and load-bearing capability to weight ratio, these structures have found widespread and varied use in industry. For example, they have been used in the building construction field and in the fabrication of vehicles, appliances, sporting equipment, packaging materials, and the like.

Heretofore, these sandwich structures have been prepared by bonding the skin layers to the foamed core using an appropriate adhesive.

SUMMARY OF THE INVENTION

In accordance with this invention, sandwich structures that comprise a rigid foamed thermoplastic polymer core that is integrally bonded to laminated skin layers are formed in a single process step in which the core which comprises a thermoplastic polymer and a chemical blowing agent is fused and expanded and the skin layers are fused and bonded to the foamed core.

In addition to reducing the cost of preparing laminated skin-foamed core sandwich structures, this method provides exceptionally uniform products that are stiff, strong, and remarkably light.

DETAILED DESCRIPTION OF THE INVENTION

In the one-step method of this invention, laminated skin-foamed core sandwich structures are produced by stacking the layers of thermoplastic polymer sheets, reinforcing material, and the core material that is to be expanded in the desired sequence in a closed mold and subjecting this sandwich to an appropriate molding cycle. The mold is heated to a temperature sufficient to fuse and foam the core and to fuse the skin layers and bond them to the core. The molding pressure is generated by the decomposition of the blowing agent in the core material.

To form sandwich structures having the desired combination of properties, the thermoplastic polymer in the skin layers must be compatible with the thermoplastic resin forming the core and must have a glass transition temperature that is 10° to 20° C., preferably 15° to 18° C., higher than that of the core polymer. Excellent results have been obtained using skin layers that comprise suspension grade polyvinyl chloride that has a glass transition temperature in the range of 75° to 85° C., preferably about 80° C., and a vinyl chloride copolymer that has a glass transition temperature in the range of 60° to 70° C., preferably about 62° C. Suitable copolymers can be prepared by the polymerization of vinyl chloride with from 5% to 30% by weight of a comonomer, such as vinyl acetate, vinyl propionate, vinylidene chloride, ethyl acrylate, and the like. The copolymer used in the core material is preferably a vinyl chloride-vinyl acetate copolymer that contains from 10% to 20% of vinyl acetate. Mixtures of a vinyl chloride polymer in a major proportion with a minor proportion of another synthetic resin can also be used as the core material provided that the mixtures have the necessary compatability with the resin used in the skin layers and have glass transition temperatures that are 10° to 20° C. lower than that of the resin used in the skin layers. In addition, other thermoplastic polymers that have the required compatability and glass transition temperatures can also be used to produce laminated skin-foamed core sandwich structures.

The skin layers of the structures of this invention are laminates formed by interleafing two or more sheets of the thermoplastic polymer that does not contain a blowing agent with at least one layer of a reinforcing material. The number of plies of thermoplastic polymer sheet and reinforcing material used to form the skin layers is dependent upon their thickness, the amount of reinforcing material desired in the molded product, and the desired thickness of the skin layers of the product. Regardless of the number of plies of resin and reinforcing material used, the outer ply is the thermoplastic resin.

The reinforcing material used in the practice of this invention may be any high strength organic or inorganic fibers that have sufficiently high temperature capabilities. They may be, for example, fibers of glass, carbon, graphite, or Aramid polymer. They may be in the form of fibrous mats, woven fabrics, or nonwoven fabrics. The preferred reinforcing material is glass fiber mats in which the fibers are continuous and in random orientation with respect to one another.

The amount of the reinforcing material used is generally that which will form laminated skin layers containing from about 10% to 50% by weight and preferably from 10% to 30% of the fibrous reinforcing material.

To prevent warping, both skin layers should contain the same materials and be of the same thickness.

Both the thermoplastic resin component of the skin layers and the thermoplastic resin component of the core of the sandwich structures of this invention are preferably rigid vinyl chloride resin compositions, that is, compositions that are formulated to withstand relatively high temperatures. In addition to the vinyl chloride resin, these compositions may contain stabilizers, plasticizers, pigments, dyes, processing aids, impact modifiers, and other additives in the amounts ordinarily employed for the purposes indicated. The compositions may be prepared by any suitable and convenient procedure, for example, by dry blending with a conventional mixer such as the Henschel blender, mixing on a two- or three-roll heated mill, or tumbling.

The vinyl chloride polymer composition that is used as the core material also contains a chemical blowing agent. The blowing agents that can be used are those that are commonly used in the production of foamed vinyl chloride resins. These include azodicarbonamide, hydrazodicarbonamide, azodiformamide, diazoaminobenzene, azobisbutyronitrile, and the like, and mixtures thereof.

The amount of the foaming agent required varies depending upon such factors as the choice of foaming agent and the desired expansion ratio. In most cases, from 1% to 20%, based on the weight of the vinyl chloride resin, of the foaming agent is required, and preferably from 1% to 10% by weight is used.

The sheeted core material is usually broken into chips or pelleted to increase its volume before it is used in the production of the novel sandwich structures.

The polyvinyl chloride composition used in the skin layers of the sandwich structures usually has a melt processing temperature in the range of 160° to 200° C., while the vinyl chloride-vinyl acetate copolymer composition used as the core material has a melt processing temperature in the range of 135° to 165° C.

In the practice of this invention, laminated skin-foamed core sandwich structures are produced by placing the foamable core material between the two laminated skin layers that comprise alternating plies of thermoplastic resin and fibrous reinforcing material in a mold, closing the mold, and heating the mold at a temperature that is sufficient to fuse and foam the core and to fuse the skin layers and bond them to the expanded core. The molding pressure is generated by the decomposition of the blowing agent in the core material. The mold is usually heated to a temperature in the range of 160° to 200° C. for a period of from 5 to 15 minutes. In each case, the molding cycle used is that which will result in the formation of the sandwich structure as quickly as possible without causing decomposition of either the expanded core or the skin layers. It is dependent upon such factors as the thermal conductivity and thickness of the skin layers and the decomposition temperature of the blowing agent and the amount of it that is used.

In a preferred embodiment of the invention, sheets of the higher melting thermoplastic resin and the reinforcing fibers are stacked in the desired sequence and cut to the dimensions of the mold. These stacks are used as the top and bottom layers of the sandwich structure with the core material between them. The resulting multi-layered sandwich is then subjected to an appropriate molding cycle to form the structures of this invention.

In another preferred embodiment of this invention, prelaminated skin layers are used in the fabrication of the sandwich structures. The prelaminated skin layers are formed by placing alternating plies of resin and reinforcing fibers in a mold and heating them at about 175° C. for 6 minutes at a pressure of 400 psi. These prelaminated skin layers are then placed in a mold with the core material between them, and the resulting sandwich is molded as indicated hereinbefore. When prelaminated skin layers are used in the preparation of the sandwich structures of this invention, the products obtained are somewhat stronger than those prepared from skin layers that are not prelaminated. Prelamination of the skin layers does, however, increase the manufacturing cost of the sandwich structures.

This invention is further illustrated by the examples that follow.

EXAMPLE 1

A. A rigid polyvinyl chloride resin composition was prepared by grinding the following materials together on a two-roll mill at 170° C. for 2 minutes:

| | Parts by Weight |
|---|---|
| polyvinyl chloride (Tenneco 185) (Tg = 80° C.) | 100.00 |
| tin stabilizer (Nuodex Nuostabe V-1562) | 1.03 |
| calcium stearate | 0.86 |

-continued

| | Parts by Weight |
|---|---|
| vinyl acetate-ethylene copolymer impact modifier (Levaprene KL-3) | 3.00 |

This composition was removed from the mill as a 12 mil sheet.

B. The core composition was prepared by grinding the following materials together on a two-roll mill at 120° C. for 2 minutes:

| | Parts by Weight |
|---|---|
| vinyl chloride-vinyl acetate copolymer (Tenneco T-318) (Tg = 62° C.) | 100.00 |
| lead stabilizer (Associated Lead TR-1) | 3.00 |
| acrylic resin processing aid (Rohm & Haas Acryloid K-147) | 3.00 |
| 50% dispersion of azodicarbonamide in dioctyl phthalate (Uniroyal Celogen AZ-3990) | 4.00 |
| potassium/zinc salts of mixed carboxylic acids (Ferro Therm-chek 5773) | 1.00 |

This composition was removed from the mill as a 12 mil sheet and then broken into chips.

C. Skin layers were formed by interleafing 3 plies of the polyvinyl chloride composition and 2 plies of 30 mil glass fiber mat (Nicofibers' Surmat) and then cut to the mold dimensions (1"×9.5").

The sandwich construction prepared by placing chipped core material between two skin layers was placed in a steel mold and heated to 177° C. over a period of 12.5 minutes. After cooling, the sandwich structure was removed from the mold. It had a mirror-smooth surface that duplicated the mold surfaces, and it had a composite density of approximately 0.7 gram/cc.

The skin portions of the sandwich structure, which contained about 20% by weight of glass fibers, were each 25 mils in thickness.

During the molding step, the core underwent approximately 3:1 expansion.

EXAMPLE 2

The procedure described in Example 1 C was repeated except that each of the skin layers contained 2 plies of the polyvinyl chloride resin sheet and 2 plies of the glass fiber mat. In forming the sandwich construction, resin plies were placed outermost, that is, against the mold surfaces.

The composite density of the sandwich structure was approximately 0.7 gram/cc. The glass content of the skins was about 12% by weight.

EXAMPLE 3

The procedure described in Example 1 C was repeated except that each of the skin layers comprised 3 plies of the polyvinyl chloride resin sheet and 3 plies of the glass fiber mat. In forming the sandwich structure, resin plies were placed at the outermost part of the skins, that is, against the mold surfaces.

The composite density of the sandwich structure was approximately 0.7 gram/cc. The glass content of the skins was about 20%.

EXAMPLE 4

The procedure described in Example 1 C was repeated except that the skin layers were prelaminated before the sandwich construction was formed. This was done by pressing the skins that comprised alternating plies of polyvinyl chloride resin and glass fiber mats at 175° C. at 400 psi for 6 minutes. The resulting skin layers were each 35 mils thick.

EXAMPLE 5

The procedure described in Example 2 was repeated except that the skin layers were prelaminated before the sandwich construction was formed by heating the alternating plies of resin and glass fiber mats at 175° C. at 400 psi for 6 minutes. The resulting skin layers were each 28 mils thick.

EXAMPLE 6

The procedure described in Example 3 was repeated except that the skin layers were prelaminated before the sandwich construction was formed by heating the alternating plies of resin and glass fiber mats at 175° C. at 400 psi for 6 minutes. The resulting skin layers were each 42 mils thick.

EXAMPLE 7

The products of Examples 2, 3, 5 and 6 were evaluated using the procedure described in ASTM Test Method D-790. The apparent flexural modulus of elasticity and strength of these sandwich structures were calculated using the following equations:

Apparent modulus of elasticity $(E) = 0.21 L^3 m/bd^3$ (psi)

Apparent strength $(S) = PL/bd^2$ (psi)

where
P = load at a given point on the load-deflection curve (lbf)
L = test or support span (inches)
b = width of beam (inches)
d = depth of beam (inches)
m = slope of the tangent of the initial straight-line portion of the load-deflection curve (lbf/in. of deflection)

For the test speciments, L = 8 inches, b = 1 inch, and d = ⅜ inch. In each case, 5 measurements were made for m and P, and the average of the 5 readings was used in the calculations.

Using the foregoing equations, the following values were obtained:

| Product of Example | Average Modulus of Elasticity (psi) | Average Strength (psi) |
| --- | --- | --- |
| 2 | $4.14 \times 10^5$ | 6486 |
| 3 | $4.53 \times 10^5$ | 7226 |
| 5 | $4.12 \times 10^5$ | 6771 |
| 6 | $5.08 \times 10^5$ | 8535 |

What is claimed is:
1. The method of forming reinforced skin-foamed core sandwich structures that comprises the steps of
   A. forming a sandwich construction comprising
      1. two skin layers, each comprising at least two plies of a thermoplastic polymer composition having a glass transition temperature in the range of 75° to 85° C. and at least one ply of reinforcing fibers,
      2. a core composition comprising a thermoplastic polymer composition having a glass transition temperature in the range of 60° to 70° C., said glass transition temperature being 10° to 20° C. lower than that of the resin in the skin layers and said polymer being compatible with that in the skin layers, and a chemical blowing agent, and
   B. heating said sandwich construction in a closed mold at a temperature sufficient to fuse and expand the core and to fuse the skin layers and bond them to the expanded core.
2. The method of claim 1 wherein the thermoplastic polymer in the skin layers has a glass transition temperature of about 80° C.
3. The method of claim 1 wherein the thermoplastic polymer in the skin layers is polyvinyl chloride.
4. The method of claim 1 wherein the thermoplastic polymer in the core is a vinyl chloride copolymer having a glass transition temperature of about 62° C.
5. The method of claim 1 wherein the thermoplastic polymer in the core is a vinyl chloride-vinyl acetate copolymer.
6. The method of claim 1 wherein the reinforcing fibers are glass fibers.
7. The method of claim 1 wherein the reinforcing plies are glass fiber mats.
8. The method of claim 1 wherein the chemical blowing agent comprises azodicarbonamide.
9. The method of claim 3 wherein the polyvinyl chloride in the skin layers has a melt processing temperature in the range of 160° to 200° C.
10. The method of claim 5 wherein the vinyl chloride-vinyl acetate copolymer in the core has a melt processing temperature in the range of 135° to 165° C.
11. The method of claim 1 wherein in step B the sandwich construction is heated to a temperature in the range of 160° to 200° C. for from 5 to 15 minutes.
12. The method of claim 1 wherein a sandwich structure comprising
   A. two skin layers, each formed of alternating plies of polyvinyl chloride having a glass transition temperature of about 80° C. and glass fiber mats and
   B. a cord comprising a vinyl chloride-vinyl acetate copolymer having a glass transition temperature of about 62° C. and a blowing agent is heated in a closed mold at a temperature in the range of 160° to 200° C. for a time sufficient to fuse and expand the core and to fuse the skin layers and bond them to the expanded core.
13. The method of claim 1 wherein the skin layers are prelaminated by heating the interleafed plies of resin and reinforcing fibers in a mold under pressure.
14. A reinforced skin-foamed core sandwich structure that is the product obtained by
   A. forming a sandwich construction comprising
      1. two skin layers, each of which comprises at least two plies of a thermoplastic polymer composition having a glass transition temperature in the range of 75° to 85° C. and at least one ply of reinforcing fibers and
      2. a core comprising a thermoplastic polymer composition having a glass transition temperature in the range of 60° to 70° C., said glass transition temperature being 10° to 20° C. lower than that of the polymer in the skin layers and said polymer being compatible with the polymer in the skin layers, and a chemical blowing agent and
   B. heating said sandwich construction in a closed mold at a temperature sufficient to fuse and expand the core and to fuse the skin layers and bond them to the expanded core.
15. The reinforced skin-foamed core sandwich structure defined in claim 14 that is the product obtained by

A. forming a sandwich construction that comprises
  1. two skin layers, each of which comprises at least two plies of polyvinyl chloride that has a glass transition temperature of about 80° C. and at least one ply of glass fiber mat and
  2. a core comprising a vinyl chloride-vinyl acetate copolymer that has a glass transition temperature of about 62° C. and a chemical blowing agent and
B. heating said sandwich construction in a closed mold at a temperature in the range of 160° to 200° C. for a time sufficient to fuse and expand the core and to fuse the skin layers and bond them to the expanded core.

* * * * *